United States Patent
Berg

(10) Patent No.: US 6,227,527 B1
(45) Date of Patent: May 8, 2001

(54) PNEUMATIC SUSPENSION SYSTEM

(75) Inventor: Jürgen Berg, Barsbüttel (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/331,041

(22) PCT Filed: Dec. 4, 1997

(86) PCT No.: PCT/DE97/02833

§ 371 Date: Jun. 15, 1999

§ 102(e) Date: Jun. 15, 1999

(87) PCT Pub. No.: WO98/26947

PCT Pub. Date: Jun. 25, 1998

(30) Foreign Application Priority Data

Dec. 17, 1996 (DE) ............................................. 196 52 351

(51) Int. Cl.⁷ .................................................. B60G 17/06
(52) U.S. Cl. ..................................... 267/218; 280/124.57
(58) Field of Search ............................. 267/64.21, 64.24, 267/220, 35, 64.26; 280/124.146, 124.147, 124.145, 124.155, 124.157

(56) References Cited

U.S. PATENT DOCUMENTS

| | | |
|---|---|---|
| 4,332,397 | 6/1982 | Steger . |
| 4,555,096 | 11/1985 | Pryor . |
| 4,778,198 * | 10/1988 | Gold ..................................... 280/702 |
| 4,826,204 * | 5/1989 | Cameron ............................. 280/698 |
| 4,911,416 * | 3/1990 | Warmuth, II ...................... 267/64.24 |
| 5,009,401 * | 4/1991 | Weitzenhof ........................ 267/64.21 |
| 5,449,150 * | 9/1995 | Watanabe et al. ................. 267/64.24 |
| 5,769,401 * | 6/1998 | Pradel ................................ 267/64.26 |

FOREIGN PATENT DOCUMENTS

| | | |
|---|---|---|
| 36 24 296 | 2/1987 | (DE) . |
| 36 31 610 | 4/1987 | (DE) . |
| 36 43 073 | 6/1988 | (DE) . |
| 196 07 804 | 5/1997 | (DE) . |
| 0 225 271 | 6/1987 | (EP) . |
| 0 259 245 | 3/1988 | (EP) . |
| 0 262 079 | 3/1988 | (EP) . |
| 0 318 696 | 6/1989 | (EP) . |
| 830 696 | 3/1960 | (GB) . |
| 57-110517 | 7/1982 | (JP) . |
| 57-129942 | 8/1982 | (JP) . |
| 2-182512 | 7/1990 | (JP) . |

* cited by examiner

Primary Examiner—Robert J. Oberleitner
Assistant Examiner—Melody M. Burch
(74) Attorney, Agent, or Firm—Collard & Roe, P.C.

(57) ABSTRACT

A pneumatic suspension system forming a McPherson strut has a pneumatic suspension pot with an integrated strut bearing, pneumatic suspension bellows made of an elastomer material, a pneumatic suspension piston, an outer guide and a damping device. The essential features of the system are: the pneumatic suspension bellows have an inclined loop whose effective diameter defined by the top and bottom extremes of the loop is substantially perpendicular to the force application line. The outer surface of the pneumatic suspension piston has cylindrical and conical parts which form a rolling contour which is not rotationally symmetrical with respect to the damping axis and which is adapted to the effective diameter of the inclined loop of the pneumatic suspension bellows in that the effective diameter is substantially parallel to the preferably rounded edges of the rolling contour. The outer guide completely surrounds the inclined loop of the pneumatic suspension bellows during both rebound and spring deflection.

11 Claims, 3 Drawing Sheets

PNEUMATIC SUSPENSION SYSTEM

BACKGROUND OF THE INVENTION

1. Field of the Invention

The invention relates to a pneumatic suspension system forming a McPherson strut.

2. The Prior Art

Such a pneumatic suspension system is described in great detail in German laid-open patent specification 36 24 296.

A McPherson strut (also referred to as a spring damper) is employed as a wheel-guiding element with only one lower transverse control arm. Conditioned by the forces originating from the wheel and acting on the strut, a moment is introduced in the latter which deteriorates the suspension properties due to increased friction within the damping device.

In order to eliminate the friction, the force application lines of the wheel stand-up force, the steering force and the spring force have to extend through one point (which equals the moment zero point). By setting a steel spring in a slanted way, the friction is minimized for the most part. However, when pneumatic suspension systems are employed, inclined positioning of the pneumatic suspension bellows is possible only conditionally because of the tied-on components (pneumatic suspension pot, pneumatic suspension piston, outer guide, etc.).

SUMMARY OF THE INVENTION

Now, the problem of the invention consists in setting the active surface of the pneumatic suspension bellows (and thus the loop) in a slanted position in such a way that the frictional forces are minimized. High driving comfort is to be assured at the same time. Furthermore, the pneumatic suspension bellows is to be protected against damage caused, for example by gravel or weather influences.

The present invention solves this problem by providing a pneumatic suspension piston surrounding a damping device as a separate structural component. The outer guide of the pneumatic suspension piston has parts with cylindrical and conical surfaces that form a roll-off contour. The roll-off contour is not rotationally symmetric with respect to the damping axis. The roll-off contour is adapted to the effective diameter of the inclined loop of the pneumatic suspension bellows in such a way that the effective diameter extends substantially parallel with the edges of the roll-off contour.

During rebound and spring deflection, the inclined loop of the pneumatic suspension bellows is always completely surrounded by the outer guide. In this way, the pneumatic suspension bellows is in any position embedded between the outer guide and the roll-off contour of the pneumatic suspension piston.

The design permits, furthermore, the use of a pneumatic suspension bellows with a single-layer strength carrier extending axially with respect to the damping axis, such pneumatic suspension bellows being optimized with respect to comfort (DE-A 36 43 073).

A thin-walled protective bellows made of elastomeric material or TPE surrounds the outer guide of the pneumatic suspension bellows and also the pneumatic suspension piston, whereby its upper end is connected with the outer guide and/or with the pneumatic suspension pot, and its lower end is connected with the pneumatic suspension piston or with the container tube of the damping device.

A sealing piston receiver made of rigid material is arranged between the pneumatic suspension piston and the container tube of the damping device in the form of a fixed composite.

The roll-off contour has a constriction enlarging the roll-off space between the outer guide and the pneumatic suspension piston.

A pot-like support body is present between the damping device and the pneumatic suspension piston, said support body being arranged particularly above the container tube.

A residual pressure valve is arranged in the pneumatic suspension piston or in the pneumatic suspension pot. It is advantageous in this connection if the residual pressure valve is arranged within the pneumatic suspension piston in the region of the piston receiver.

Said residual pressure valve facilitates the installation on the vehicle and, furthermore, prevents damage during repair work or in the event of failure of the pressure system.

The pneumatic suspension piston has a receiver for a stabilizer joint, whereby such receiver is arranged particularly in the region of the piston receiver.

The edges of the roll-off contour are rounded, whereby their radius is preferably greater than or equal to the inner radius of the loop.

A process for producing the pneumatic suspension system as defined by the invention consists in cutting off the pneumatic suspension bellows along a slanted line before it is installed, whereby the slanted surface of the section is finally secured on the pneumatic suspension piston. In the operating condition under pressure, the pneumatic suspension bellows will then form with an inclined loop.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the views.

DETAILED DESCRIPTION OF THE PREFERRED EMBODIMENT

Figure 1:
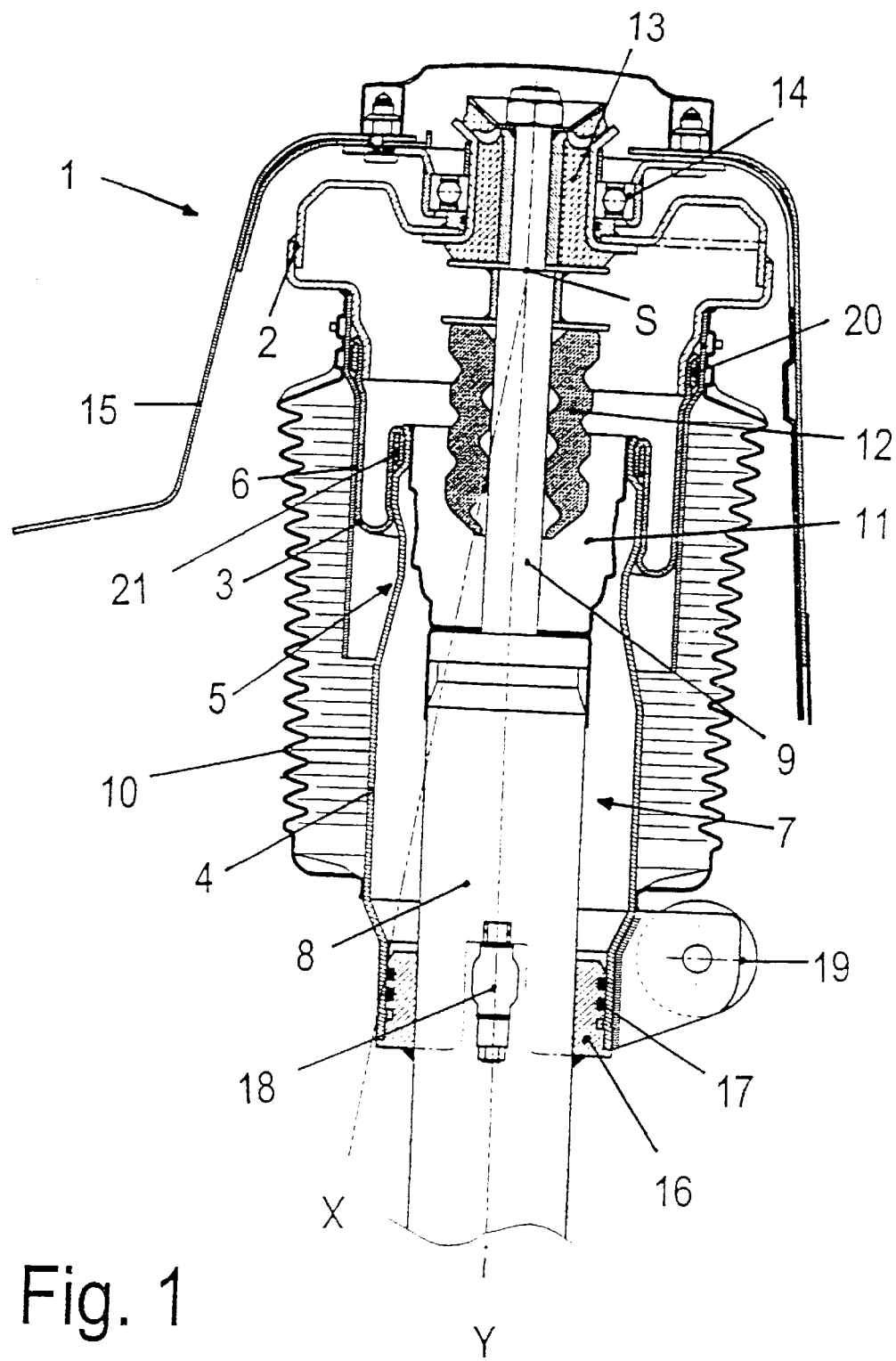
FIG. 1 is a sectional representation of a pneumatic suspension system.

According to FIG. 1, pneumatic suspension system 1 has pneumatic suspension pot 2 with an integrated strut bearing 13, which is a rubber-metal bearing connected with the vehicle body 15. Furthermore, a ball bearing 14 is arranged between the strut bearing and the vehicle body.

The ends of pneumatic suspension bellows 3, which is made of elastomeric material, are secured by means of clamping rings 20 and 21 on pneumatic suspension pot 2 and, whereby, pneumatic suspension piston 4, whereby the pneumatic suspension piston has a not rotationally symmetric roll-off contour 5, which is explained in greater detail in the following in connection with FIG. 2.

The cylindrical outer guide 6 for pneumatic suspension bellows 3 is connected with pneumatic suspension pot 2, whereby the outer guide always completely surrounds the inclined loop of the pneumatic suspension bellows.

The damping device 7 consists of a container tube 8 with an integrated piston rod guide (not shown here) and a piston rod 9, which in turn is connected in a fixed way with the strut bearing 13 and which slidingly immerses in container tube 8 by means of the piston rod guide during rebound and spring deflection, whereby, furthermore, the damping axis "Y" extends angularly relative to force application line "X", forming a point of intersection "S" in the region where piston rod 9 is tied to strut bearing 13. Said point of intersection shifts only slightly during rebound and spring deflection. Container tube 8 is connected with the wheel carrier (not shown here).

A support body 11 in the form of a pot-like element is arranged between damping device 7 and pneumatic suspension piston 4 above container tube 8.

Piston rod 9, furthermore, has a stop buffer 12 made of elastomeric material, whereby the stop buffer immerses during rebound in the pot-like support body 11 in a supporting manner.

A thin-walled protective folding bellows 10 made of elastomeric material or TPE, the ends of which are connected with outer guide 6 and, respectively, pneumatic suspension piston 4, protects pneumatic suspension bellows 3 against damage caused, for example by gravel or weather influences.

A sealing piston receiver 16 made of rigid material (metal or a suitable plastic) is present between pneumatic suspension piston 4 and container tube 8 and includes the application of O-rings 17. Furthermore, within the region of said piston receives a residual pressure valve 18 as well as a receiver 19 for the stabilizer joint are arranged within pneumatic suspension piston 4.

Figure 2:
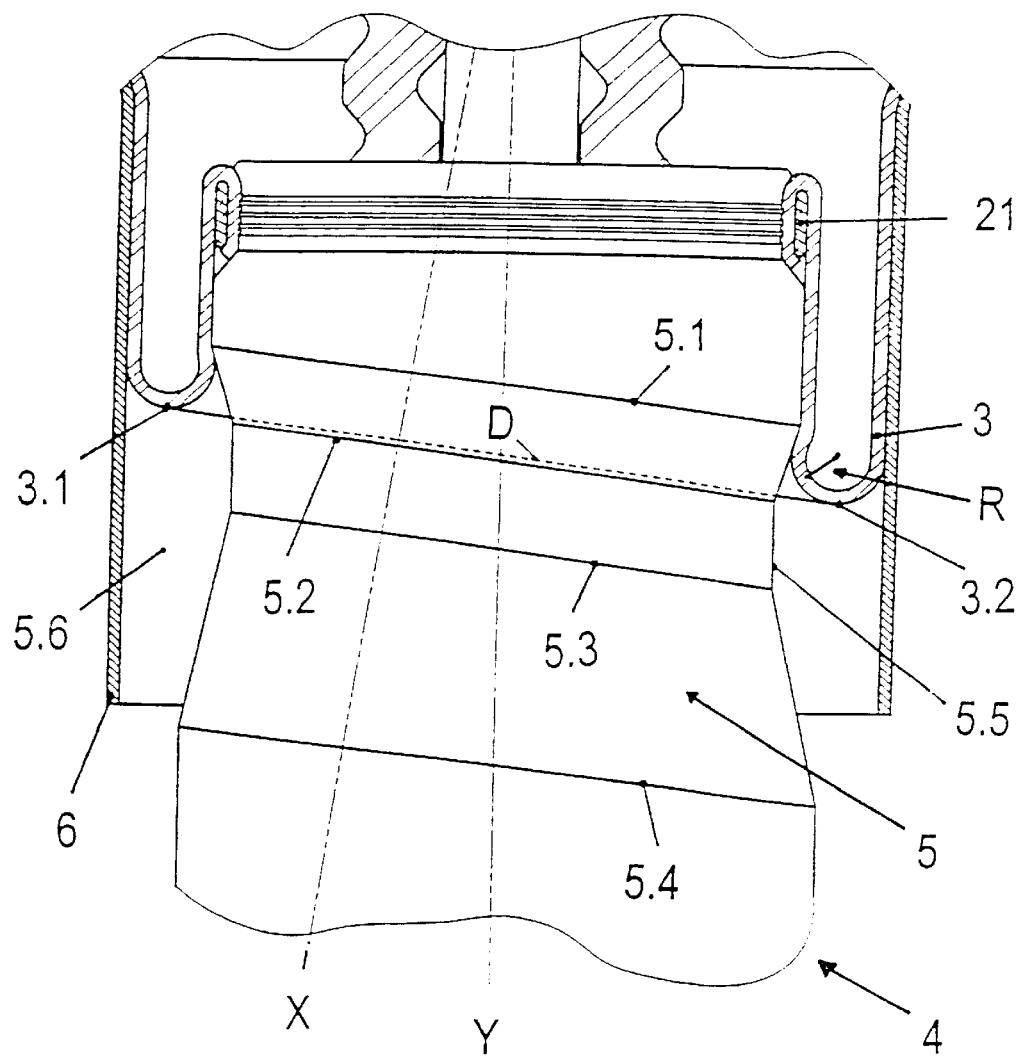
FIG. 2 is a front view of the non-rotation-symmetric roll-off contour of the pneumatic suspension piston, as well as a sectional representation of the other structural components.

Now, FIG. 2 shows details with respect to the roll-off contour 5 of pneumatic suspension piston 4, said roll-off contour being not rotationally symmetric with respect to damping axis "Y". The special feature of said roll-off contour is that it has cylindrically and conically extending surface parts forming the edges 5.1, 5.2, 5.3 and 5.4. The asymmetry of said roll-off edges is illustrated by the fact that the individual elements of the contour are not mirror-symmetric with respect to all mirror planes extending through damping axis "Y", which is entirely opposed to the roll-off edges according to DE-A 36 24 296, where the elements of the contour are always mirror-symmetric, i.e. rotation-symmetric with the same reference point.

Pneumatic suspension bellows 3 has an inclined extending loop, whose effective diameter "D"—which is defined by the upper and lower loop extremes 3.1 and, 3.2 respectively extends substantially perpendicular to the force application line "X", and substantially parallel with edges 5.1, 5.2, 5.3 and 5.4 of roll-off contour 5.

Edges 5.1, 5.2, 5.3 and 5.4 of roll-off contour 5 are particularly rounded, whereby their radius is preferably greater than or equal to the inner loop radius "R".

Roll-off contour 5 has a constriction 5.5, enlarging the roll-off space 5.6 between the outer guide 6 and the pneumatic suspension piston. In this connection, the outer guide always completely surrounds the inclined loop of pneumatic suspension bellows 3 during rebound and spring deflection. In this way, the pneumatic suspension bellows is in any position embedded between the outer guide 6 and the roll-off contour 5 of the pneumatic suspension piston.

The region of pneumatic suspension piston 4 where pneumatic suspension bellows 3 is secured by means of clamping ring 21 usually has a mirror-symmetric outer contour with respect to all mirror planes extending through damping axis "Y".

Figure 3:
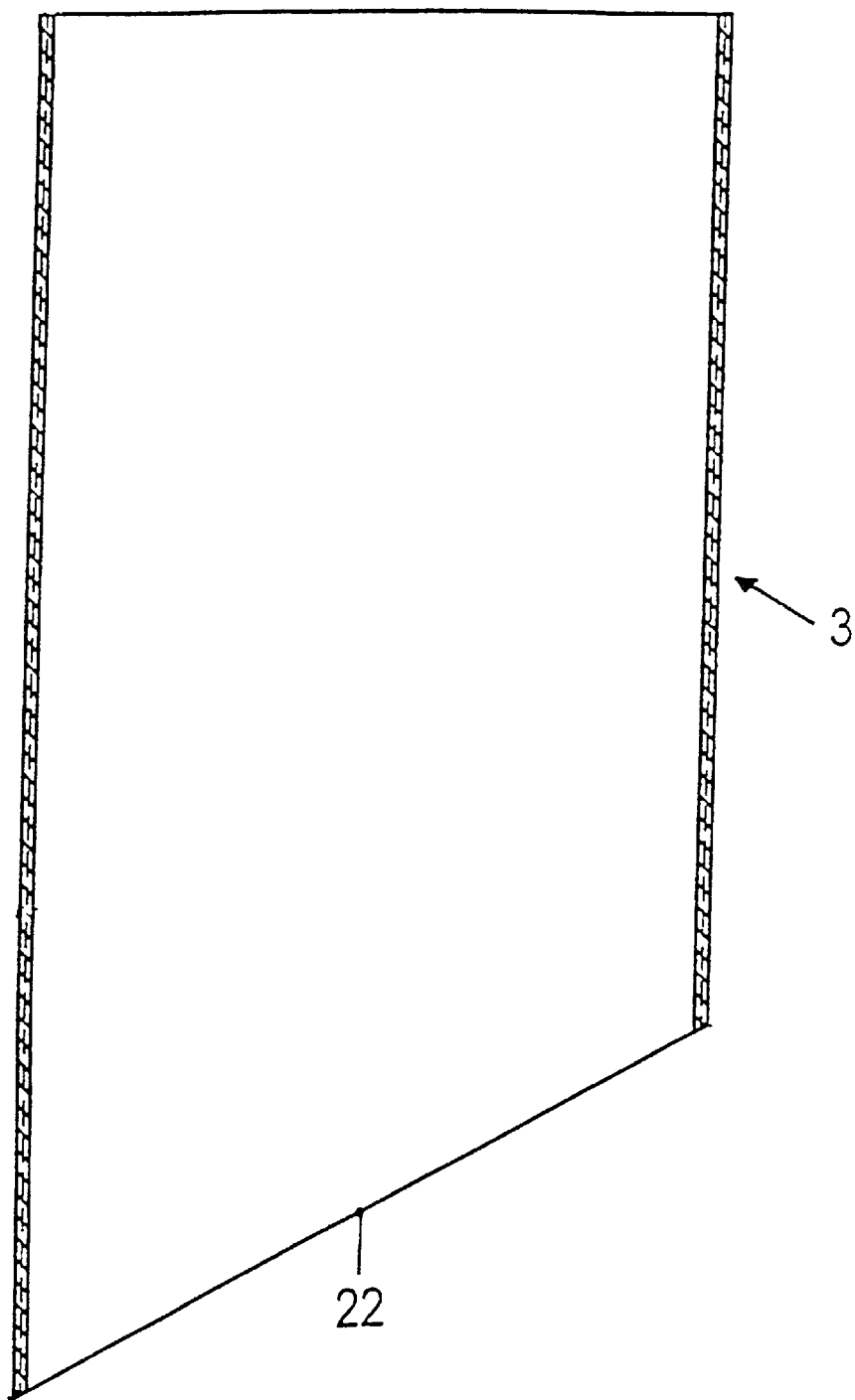
FIG. 3 is a longitudinal section through the pneumatic suspension bellows prior to its installation.

Now, FIG. 3 shows pneumatic suspension bellows 3 before it is installed, whereby said bellows is cut off along a slanted line, forming the slanted sectional surface 22. Said sectional surface is secured on the pneumatic suspension piston, whereby pneumatic suspension bellows 3 forms an inclined loop when it is in the operating condition under pressure (FIGS. 1 and 2).

Accordingly, while only a few embodiments of the present invention has been shown and described, it is obvious that many changes and modifications may be made thereunto without departing from the spirit and scope of the invention.

What is claimed is:

1. A pneumatic suspension system (1) forming a McPherson strut, comprising:
   a pneumatic suspension pot (2) comprising an integrated strut bearing connected with other structural components;
   a pneumatic suspension bellows (3) made of elastomeric material comprising an embedded strength carrier, wherein an upper end of said pneumatic suspension bellows is secured to said pneumatic suspension pot (2) by a clamping ring (20), and said pneumatic suspension bellows having an inclined extending loop with an effective diameter (D) defined by upper and lower extremes (3.1, 3.2) extending perpendicular to a force application line (X) caused by a wheel load;
   an outer guide (6) connected to said pneumatic suspension pot (2) such that said outer guide completely surrounds said inclined extending loop of said pneumatic suspension bellows (3) during rebound and spring deflection;
   a damping device (7) comprising a container tube (8) connected with a wheel carrier, a piston rod (9), and a piston rod guide, wherein said piston rod (9) is fixedly connected with a strut bearing (13) and is slidingly immersed into a container tube by said piston rod guide during rebound and spring deflection, and a damping axis (Y) extending angularly relative to a force application line (X), forming a point of intersection (S) where said piston rod is attached to said strut bearing (13), the position of said point of intersection shifting during rebound and spring deflection;
   a pneumatic suspension piston (4) secured to a lower end of said pneumatic suspension bellows (3) by a clamping ring and surrounding said damping device (7), said pneumatic suspension piston (4) having an outer surface having cylindrically and conically extending surface parts forming a not rotationally symmetric roll-off contour (5) with respect to said damping axis (Y), said roll-off contour corresponding to said effective diameter (D) of said inclined extending loop, such that said effective diameter (D) extends substantially parallel with edges (5.1, 5.2, 5.3, 5.4) of said roll-off contour (5);
   a thin-walled protective folding bellows (10) made of elastomeric material surrounding said outer guide (6) and said pneumatic suspension piston (4), wherein an upper end of said thin-walled protective folding bellows is connected with said outer guide and said pneumatic suspension pot (2), and a lower end is connected with said pneumatic suspension piston (4);
   a residual pressure valve (18) disposed in one of said pneumatic suspension piston (4) and pneumatic suspension pot (2); and
   a sealing piston receiver (16) made of rigid material arranged between said pneumatic suspension piston (4) and said container tube (8) of said damping device (7) in the form of a fixed composite.

2. The pneumatic suspension system according to claim 1, wherein said residual pressure valve (18) is disposed in said pneumatic suspension piston (4) in the region of said piston receiver (16).

3. The pneumatic suspension system according to claim 1, wherein said roll-off contour (5) has a constriction (5.5) enlarging a roll-off space (5.6) between said outer guide (6) and said pneumatic suspension piston (4).

4. The pneumatic suspension system according to claim 1, wherein a pot-shaped support body (11) is placed between said damping device (7) and said pneumatic suspension piston (4), said support body is disposed above said container tube (8).

5. The pneumatic suspension system according to claim 1, wherein said piston rod (9) of said damping device (7) has a stop buffer (12) made of elastomeric material.

6. The pneumatic suspension system according to claim 4, wherein said stop buffer (12) is supportingly immersed in said pot-shaped support body (11) during rebound.

7. The pneumatic suspension system according to claim 1, wherein said pneumatic suspension piston (4) comprises a receiver (19) for a stabilizer joint.

8. The pneumatic suspension system according to claim 7, wherein said receiver (19) for said stabilizer joint is arranged in the region of said sealing piston receiver (16).

9. The pneumatic suspension system according to claim 1, wherein said edges (5.1, 5.2, 5.3, 5.4) of said roll-off contour (5) are rounded.

10. The pneumatic suspension system according to claim 9, wherein the radius of said edges (5.1, 5.2, 5.3, 5.4) is greater than said inner loop radius (R).

11. The pneumatic suspension system according to claim 9, wherein the radius of said edges (5.1, 5.2, 5.3, 5.4) is equal to said inner loop radius (R).

* * * * *